US006322278B1

(12) United States Patent
    Roberts

(10) Patent No.: US 6,322,278 B1
(45) Date of Patent: Nov. 27, 2001

(54) STEADY LEVER

(75) Inventor: Gerald Bernard Roberts, Monroe, MO (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 09/532,043

(22) Filed: Mar. 21, 2000

(51) Int. Cl.⁷ ...................................... F16B 7/10
(52) U.S. Cl. .................. 403/52; 200/61.7; 200/335; 74/469; 403/321; 403/315
(58) Field of Search ..................... 403/321, 315, 403/316, 317, 52, 59, 65, 164, 150–163, 348, 119, 79, 113; 74/469, 490.12, 490.13, 490.14, 490.15; 200/18, 61.7, 335, 336, 337

(56) References Cited

U.S. PATENT DOCUMENTS

| | | | |
|---|---|---|---|
| 3,058,146 | * 10/1962 | Harrison et al. | 403/348 |
| 3,142,367 | * 7/1964 | Brown et al. | 403/52 |
| 3,867,044 | * 2/1975 | Downing | 403/155 |
| 4,694,705 | * 9/1987 | Frankhouse et al. | 403/163 |
| 5,534,858 | * 7/1996 | Tinkham | 200/61.7 |

* cited by examiner

Primary Examiner—Lynne H. Browne
Assistant Examiner—Aaron M Dunwoody

(57) ABSTRACT

A pivoting connection is described that uses an H-shaped connector secured within the X-shaped opening of a base. One end of the H shaped connector can be inserted into the X-shaped opening at an angle corresponding to one leg of the X but is secured in the opening when twisted to a vertical position. This pivoting connection provides a reliable connection that is durable, weather resistant, and does not readily seize.

16 Claims, 5 Drawing Sheets

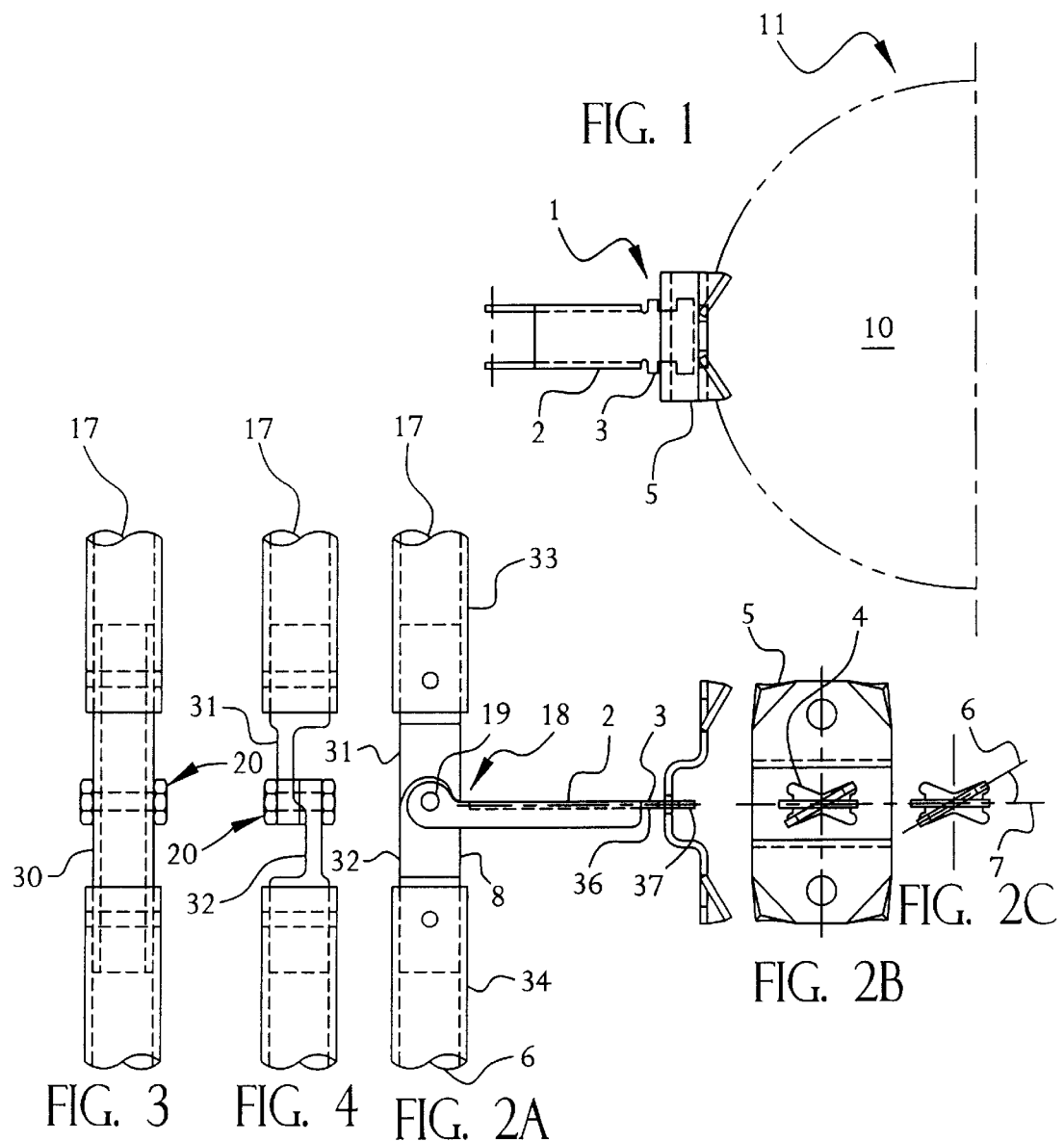

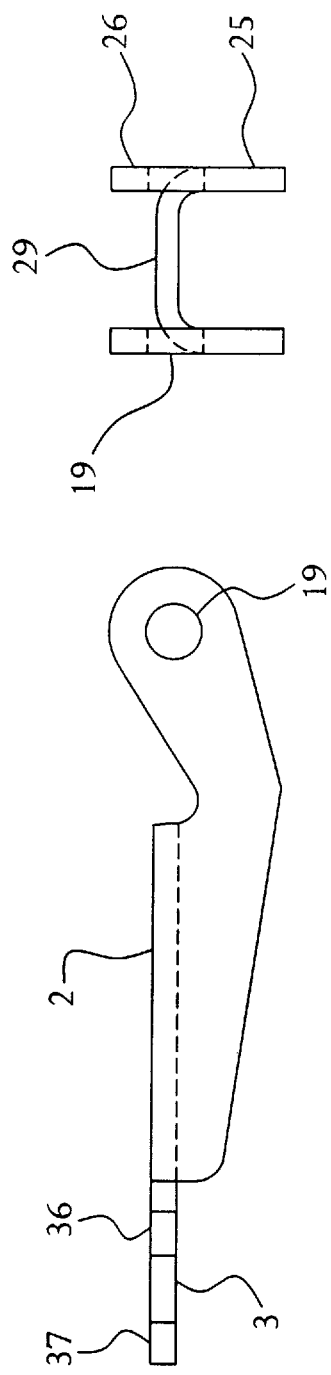
FIG. 8
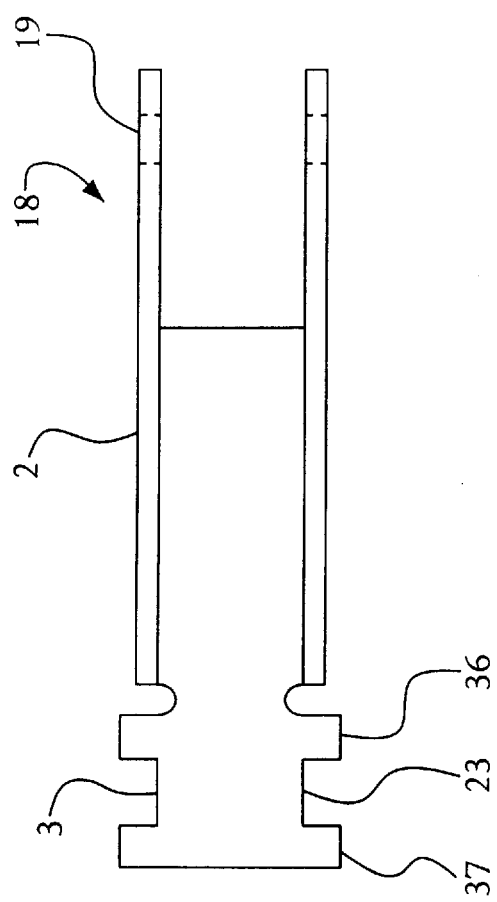
FIG. 10
FIG. 9

STEADY LEVER

FIELD OF THE INVENTION

A durable pivot mechanism with bearing surface is described that provides for smooth planar travel perpendicular to the pivot axis. The absence of ball bearings, sealed joints, or the need for lubrication makes the pivot mechanism of the invention well suited for outdoor applications in inaccessible locations. The pivot mechanism of the invention is particularly well suited for use on utility poles.

BACKGROUND OF THE INVENTION

In certain situations, there is a need for a durable pivot connection that is able to withstand cyclic weather extremes with little or no maintenance yet provide a reliable pivot action after extended inaction. Additionally, the pivot connection must be able to move smoothly in a plane despite significant twisting and other nonplanar forces.

SUMMARY OF THE INVENTION

It is an object of the invention to provide a pivoting connection that is durable with little need for maintenance.

It is another object of the invention to provide a pivot mechanism that will move smoothly in a plane and will resist torsional and other forces outside the plane of travel.

In accordance with these and other objects of the invention that will become apparent from the description herein, a pivoting connection according to the invention includes:

a. a first connector member extending in a first plane and having a first end with a first pin opening transverse to said first plane and a second end with a first pair of projections spaced from a second pair of projections in substantially an H shape, b. a second connector member having a first end with transverse pin openings for mating with the pin openings of the first connector member to receive a pin therethrough and pivotably secure said first connector member and said second connector member, and a second end for connection to a movable member that can displace in a second planar direction, and c. a base member having first and second coplanar ends with an offset section therebetween, said offset section having an X-shaped opening therein made of two diagonal lengths and a second support surface therebetween for receiving one pair of said projection of the H-shaped end of said first connector member when inserted along a nonvertical position and retain said first connector member in a vertical position.

The pivoting connection of the invention provides a simple, durable pivoting connection for guidance in a plane of motion with little maintenance and high reliability. One leg of the H-shaped end of the connector member fits through the X-shaped opening in the base member along one leg of the X shape and is twisted to a vertical position to secure the H-shaped end within the base member. The first support surface of the H-shaped end of the connector member rests directly on and is supported by the second support surface of the base member in a low friction, metal point-to-point bearing relationship that is essentially immune to the adverse effects of weathering or rusting.

BRIEF DESCRIPTION OF THE FIGURES

FIG. 1 is a top view of a pivoting connector secured to a support pole.

FIGS. 2A–4 show alternate embodiments of a pivoting connection to a movable control rod.

FIGS. 8–12 depict the connector member as formed with integral lateral walls and then as bent to final shape with various views thereof. shaped opening therein.

DETAILED DESCRIPTION

Figure 5:
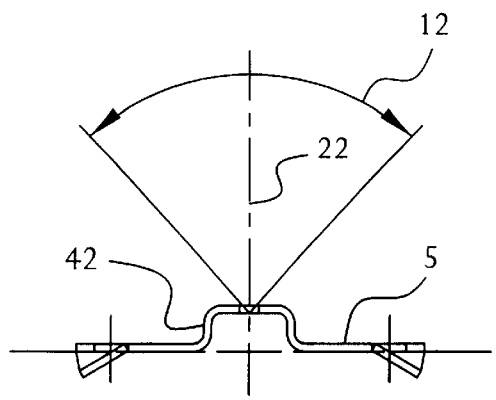
FIGS. 5–7 illustrate ranges of angular motion and lateral displacement for the pivoting connector of the invention as well as additional embodiments for connection to a movable control arm.
Figure 6:
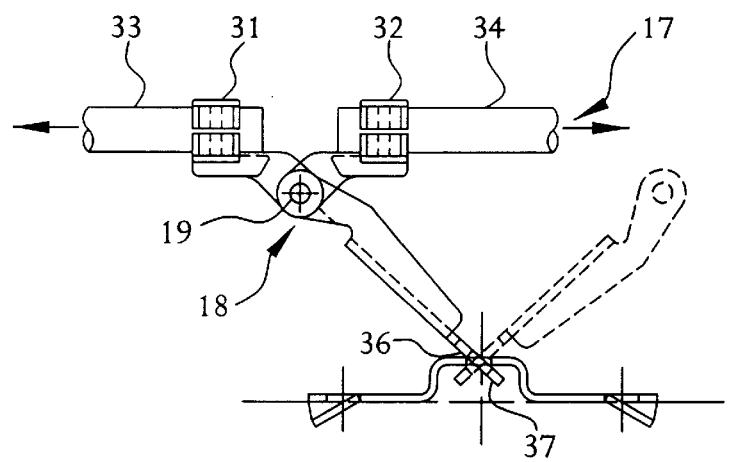
Figure 7:
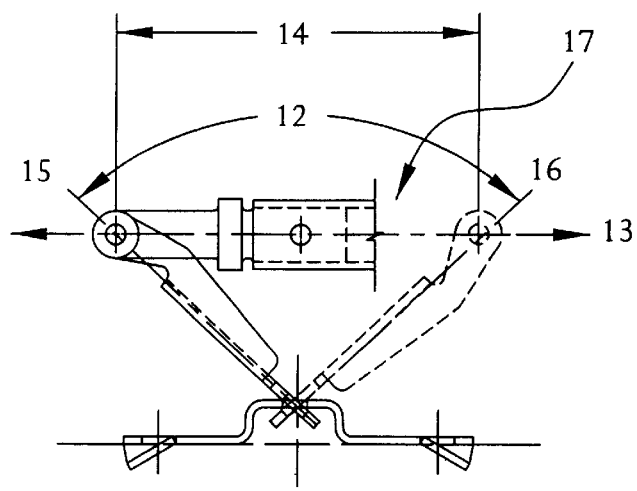

The pivoting connection 1 of the invention is made with a first connector member 2 having an H-shaped end 3 dimensioned to fit into an X-shaped opening 4 in a base member 5 at a nonvertical insertion angle 6 and be secured therein at a vertical angle 7, and a second connector member 8 pivotably connected to the other end of the first connector member 2. The second connector member 8 is attached to a movable member 9, such as a control linkage for operating a high voltage overhead power switch, that requires intermittent lateral movement without twisting outside the plane of motion. The base member 5 is secured to a support 11, such as a utility pole 10.

Alternate configurations for second connector member 8 are shown in FIGS. 2A–4, 6 and 7. FIG. 3 shows the use of a pipe 30 with pin 20 passing through the entire diameter of pipe 30 to provide a rigid connection between pipes 33, 34. FIGS. 2A, 2B, 2C and 4 illustrate offset arms 31, 32 secured within each end of pipes 33, 34 with pin 20 passing through the opposite mated openings in each for a pivoting connection of pipes 33, 34 that will allow angular movement within a common plane as well as lateral planar displacement. This offset arrangement can be used in connection with an external connection shown in side view in FIG. 6. In this figure, each of the offset arms 31, 32 is laterally displaced from the longitudinal displacement axis of control rods 33, 34 but is secured to their respective rods by an external frictional or mechanical fit around each of rods 33, 34.

The first connector member 2 has one end pivotally supported by the base member 5 and the other end pivotally connected to a movable member 9. The pivot axes of these ends are parallel and allow the first connector member 2 to move around each axis within a range of motion 12 in the displacement plane 13 of the movable member 9. Such a motion is useful in many applications but particularly so in connection with high voltage interrupter switch assemblies of the type described in copending application Ser. No. 09/457,593, the disclosure of which is herein incorporated by reference. The distance 14 traversed by movable member 9 from a first position 15 to a second position 16 is intended to be adequate to open or close an electrical connection associated with the position of moveable arm member 17.

The first connector member 2 extends longitudinally in a first plane and has a first end 18 with a transverse first pin opening 19 for establishing a pivotal connection with a second connector member 8 that is preferably secured to a moveable arm member 17. Second connector member 8 allows movement within a plane but stabilizes moveable arm member 17 against transplanar motion.

If desired and the structure of the moveable arm member 17 permits, the first pin opening 19 of the first connector member 2 can be pivotally secured directly to the moveable arm member 17 by a pin 20 inserted through the first pin opening 19 and a transverse opening through the moveable arm member 17. In such a direct connection embodiment, the moveable arm member 17 is equivalent in function to the second connector member 8.

The H-shaped end 3 of the first connector member 2 is roughly in the form of the capital letter "H" with leading projections 37 and trailing projections 36 extending transverse to the longitudinal axis 22 of the first connector member 2. Each pair of projections 36, 37 is longitudinally separated by a flat distance 23 that will act as a pivotal support surface when first connector member 2 is inserted into an appropriately sized opening within base member 5.

Figure 11:
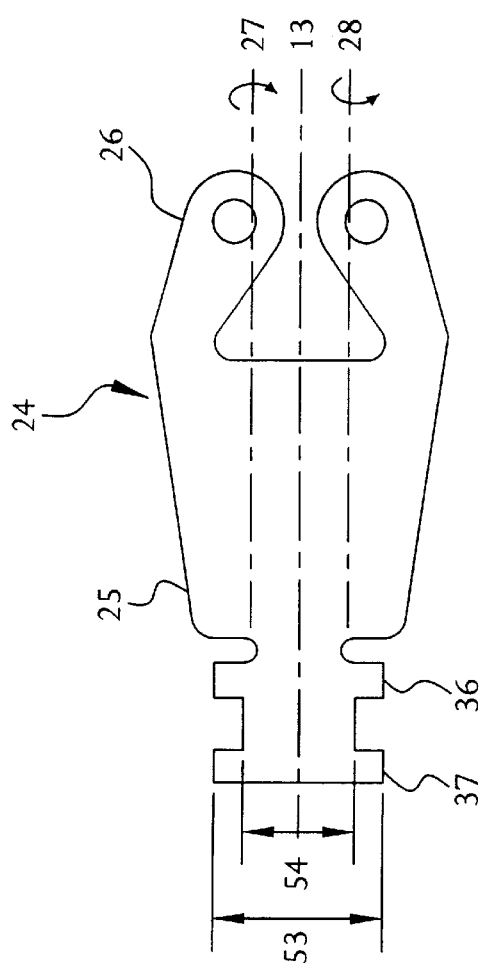
Figure 12:
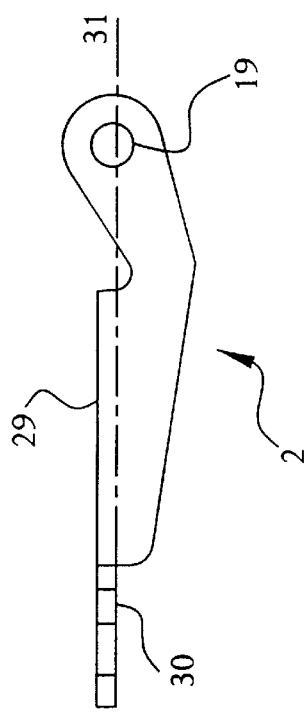

First connector member 2 and base member 5 may be made by molding, forging, and stamping and forming techniques of durable, weather resistant, workable material. As shown in FIGS. 11 and 12, first connector member is stamped as a blank unit 24 from formable material. Blank 24 is symmetrical about longitudinal axis with trailing projections 36 separated by a distance from leading projections 37 to form an "H"-shaped end. Along each side of blank 24 is an extended midsection 25 and a terminal end 26 with first pin opening 19. Blank 24 is formed into first connector 2 by bending midsection 25 and terminal end 26 along parallel axes 27, 28 into first connector 2 (FIG. 12).

The bending operations on blank 24 can occur by way of any forming technique. Examples include the use of a punch, die, or some combination of these so that midsection 25 and terminal end 26 are rotated roughly 90° relative to planar surface 29. Preferably, the bottom 30 of planar surface 29 forms a plane 31 that passes through the center of first pin opening 19. This orientation maximizes the leverage forces of and minimizes the shearing forces on first connector member 2 when pin 20 is connected to a movable arm member.

Figure 13:
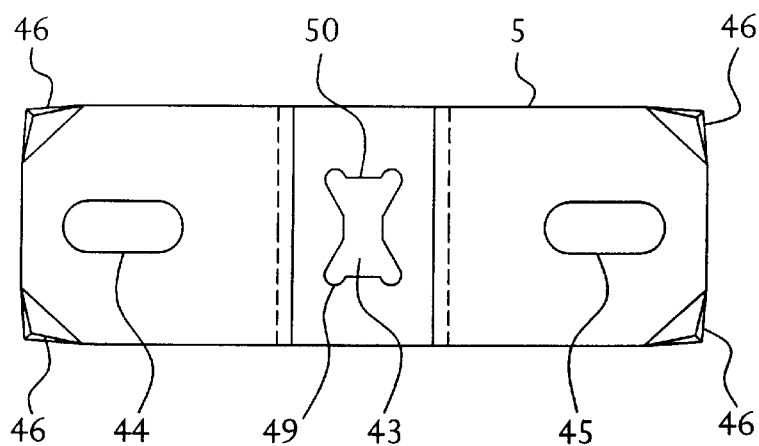
FIGS. 13–15 show details of the base member that can be mounted to a support structure with an X-shaped opening to receive and hold the H-shaped end of the connector member illustrated in FIGS. 8–10 and 12.
Figure 14:
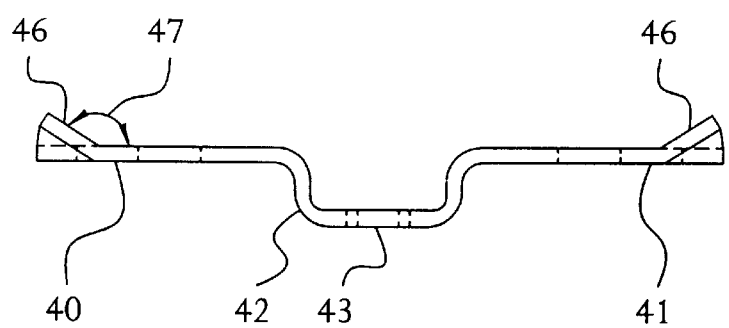
Figure 15:
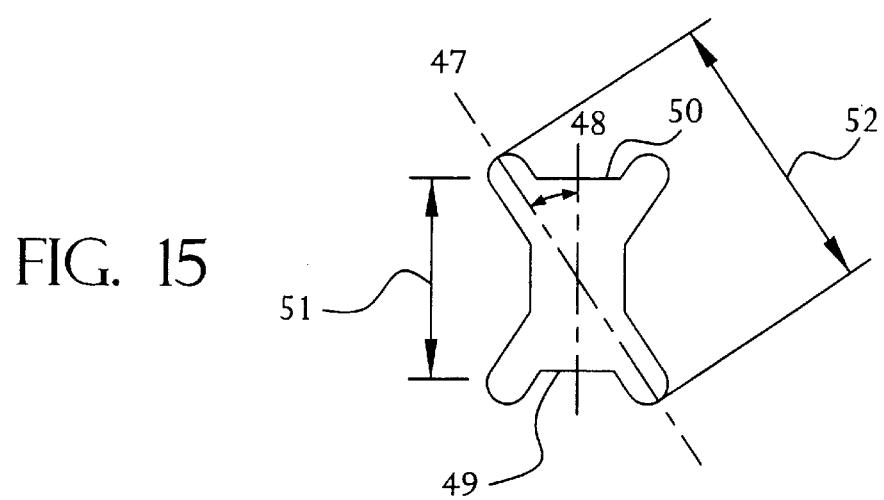

Base member 5 is shown in more details in FIGS. 13 and 14. As illustrated, base member 5 has first and second coplanar ends 40, 41 with an intermediate support section 42 therebetween having an X-shaped opening 43 in support section 42. Preferably, the coplanar ends 40, 41 are used to secure the base member to the outer surface of a support member, such as a utility pole or wall, with bolts passing through bolt holes 44, 45. Angled edges 46 can rise from coplanar ends 40, 41 at an obtuse angle 47 that is adequate to apply continuous force on any bolts used to secure base member 5 to a support. Angled edges 46 are also intended to pierce into the mounting surface to maintain stability against twisting as well as dimensional shrinkage in the support surface.

Generally, support surface 42 is elevated relative to coplanar ends 40, 41 to provide clearance for the lead pair of projections 37 on first connector 2. If the support surface is cut or shaped to provide clearance under the base member 5 beneath the X-shaped opening 43, the support section 42 may lie on the same or substantially the same plane as the coplanar ends 40, 41 of the base member 5.

The X-shaped opening 43 is shaped and dimensioned to allow insertion of the lead projections 37 when inserted along angle 47 but retain the first connector member when twisted to a vertical position 48. Preferably, angle 47 is within the range from about 5° to about 180° relative to vertical position 48. The length 52 of opening 43 along angle 47 will correspond to the length 53 of lead projections 37.

Flat bearing support surfaces 49, 50 are formed into opening 43 along the top and bottom between each leg of the X-shape. The vertical height 51 between bearing surfaces 49, 50 corresponds to the vertical height 54 of the flat space between lead projection 37 and trailing projections 36 on the first connector member 2.

What is claimed is:

1. A pivoting connector that comprises:
   a. a first connector member extending in a first plane and having a first end with a first pin opening transverse to said first plane and a second end having a pair of leading projections spaced from a pair of trailing projections in substantially an H shape,
   b. a second connector member having a first end with transverse pin openings for mating with the pin openings of the first connector member to receive a pin therethrough and pivotably secure said first connector member and said second connector member, and a second end which is movable in a second planar direction, and
   c. a base member having first and second ends with an offset section therebetween, said offset section having an X-shaped opening therein made of two diagonal lengths and a flat bearing surface therebetween for receiving said pair of leading projections therethrough when inserted in a nonvertical position corresponding to said X-shaped opening and retain said first connector member when twisted into a vertical position with bearing support on said flat bearing surface.

2. A pivoting connector according to claim 1 wherein said first connector member has a pair of lateral walls extending substantially perpendicular to said first planar direction.

3. A pivoting connector according to claim 2 wherein each of the lateral walls has an aligned pin opening for receiving a pivot pin therethrough.

4. A pivoting connector according to claim 2 wherein each of the lateral walls is integrally formed with said first connector member.

5. A pivoting connector according to claim 1 wherein said first connector member is formed to shape.

6. A pivoting connector according to claim 1 wherein said pair of leading projections is coplanar with said trailing pair of projections.

7. A pivoting connector according to claim 1 wherein said leading projections and said trailing projections are coplanar with said first plane.

8. A pivoting connector according to claim 1 wherein a movable member has a round cross section, and said second end of the second connector member is secured to said movable member by receiving one end of said movable member in a sleeve that is secured to said second member.

9. A pivoting connector according to claim 1 wherein a movable member is a length of pipe with a round cross section, and said second end of the second member is secured to said movable member by a rod extending into said movable member and secured therein.

10. A pivoting connector according to claim 1 wherein said base member has a pair of bolt holes for securing said base member to a support.

11. A pivoting connector according to claim 10 wherein said base members has corners that are bent sufficiently to apply force when said base member is secured to said support.

12. A pivoting connector comprising:
   a. a base member having a pair of angled long openings on either side of a bearing support surface in the general form of an X shape, and
   b. a first connector member having two pair of spaced apart projections in the form of an H shape, wherein one pair of said projections fits into the X-shaped opening when inserted along a nonvertical position but is retained and supported on said bearing surface when twisted to a vertical position.

13. A pivoting connector according to claim 12 wherein said base member and said first connector are made by molding, forging, or stamping and forming.

14. A pivoting connector according to claim 12 wherein said first connector is pivotably secured to a second connector member.

15. A pivoting connector according to claim 14 wherein said second connector member is secured at one end to said first connector member and at a second end to a control arm.

16. A pivoting connector according to claim 14 wherein said second connector member moves within a plane and stabilizes against transplanar motion.

\* \* \* \* \*